(12) United States Patent
Probert

(10) Patent No.: US 9,230,455 B2
(45) Date of Patent: Jan. 5, 2016

(54) STEGANOGRAPHIC EMBEDDING OF EXECUTABLE CODE

(71) Applicant: Digital Immunity LLC, Holliston, MA (US)

(72) Inventor: Thomas H Probert, Holden, MA (US)

(73) Assignee: DIGITAL IMMUNITY LLC, Holliston, MA (US)

( * ) Notice: Subject to any disclaimer, the term of this patent is extended or adjusted under 35 U.S.C. 154(b) by 0 days.

(21) Appl. No.: 14/299,408

(22) Filed: Jun. 9, 2014

(65) Prior Publication Data

US 2014/0337639 A1     Nov. 13, 2014

Related U.S. Application Data

(63) Continuation-in-part of application No. 12/965,067, filed on Dec. 10, 2010, now Pat. No. 8,958,546.

(60) Provisional application No. 61/832,265, filed on Jun. 7, 2013, provisional application No. 61/285,653, filed on Dec. 11, 2009.

(51) Int. Cl.
| | |
|---|---|
| *G09C 5/00* | (2006.01) |
| *G06F 12/14* | (2006.01) |
| *G06F 21/00* | (2013.01) |
| *G06F 21/12* | (2013.01) |
| *H04L 9/32* | (2006.01) |
| *G06F 21/70* | (2013.01) |

(52) U.S. Cl.
CPC ............... *G09C 5/00* (2013.01); *G06F 21/125* (2013.01); *H04L 9/3242* (2013.01); *G06F 12/1408* (2013.01); *G06F 21/70* (2013.01); *H04L 2209/16* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 6,782,478 B1 * | 8/2004 | Probert ....................... 713/191 |
| 7,080,257 B1 | 7/2006 | Jakubowski | |
| 7,236,610 B1 | 6/2007 | Luo et al. | |
| 2005/0105761 A1 | 5/2005 | Zimmer et al. | |

(Continued)

OTHER PUBLICATIONS

Cox et al., Digital Watermarking, Academic Press, 2002, pp. 50-55, San Diego, CA, ISBN: 1-55860-714-5.

(Continued)

*Primary Examiner* — Alexander Lagor
(74) *Attorney, Agent, or Firm* — Ann-Louise Kerner; DLA Piper LLP (US)

(57) ABSTRACT

A method for digital immunity includes identifying a call graph of an executable entity, and mapping nodes of the call graph to a cipher table of obscured information, such that each node based on invariants in the executable entity. A cipher table maintains associations between the invariants and the obscured information. Construction of an obscured information item, such as a executable set of instructions or a program, involves extracting, from the cipher table, ordered portions of the obscured information, in which the ordered portions have a sequence based on the ordering of the invariants, and ensuring that the obscured information matches a predetermined ordering corresponding to acceptable operation, such as by execution of the instructions represented by the obscured information, or steganographic target program (to distinguish from the executable entity being evaluated). The unmodified nature of the executable entity is assured by successful execution of the steganographic target program.

10 Claims, 5 Drawing Sheets

(56) References Cited

U.S. PATENT DOCUMENTS

| | | |
|---|---|---|
| 2006/0210138 A1 | 9/2006 | Hilton et al. |
| 2008/0016365 A1 | 1/2008 | Moskowitz |
| 2008/0148061 A1* | 6/2008 | Jin et al. .......... 713/187 |
| 2008/0301452 A1 | 12/2008 | Horne et al. |
| 2009/0105761 A1 | 4/2009 | Robie |
| 2009/0187963 A1 | 7/2009 | Bori |
| 2009/0254752 A1 | 10/2009 | Johansson |

OTHER PUBLICATIONS

Collberg et al., Watermarking, Tamper-Proofing, and Obfuscation—Tools for Software Protection, University of Arizona, Dept. of Computer Science, Feb. 10, 2000.

International Search Report mailed Dec. 5, 2011 in corresponding International Application No. PCT/US10/59882.

* cited by examiner

STEGANOGRAPHIC EMBEDDING OF EXECUTABLE CODE

RELATED APPLICATIONS

This application claims priority to and the benefit under 35 U.S.C. §119(e) of U.S. Provisional Patent Application No. 61/832,265, filed Jun. 7, 2013, entitled "STEGANOGRAPHIC EMBEDDING OF EXECUTABLE CODE," and is a continuation-in-part under 35 U.S.C. §120 of U.S. application Ser. No. 12/965,067, filed Dec. 10, 2010, entitled "STEGANOGRAPHIC MESSAGING SYSTEM USING CODE INVARIANTS," which claims the benefit of U.S. Provisional Patent Application No. 61/285,653, filed Dec. 11, 2009, entitled "SECURE SPLIT KEY STEGANOGRAPHIC MESSAGING METHOD," the contents of which are all hereby incorporated by reference in their entirety.

BACKGROUND

Steganography and digital watermarking are powerful techniques for protecting intellectual property by embedding signatures and other information in audio, video and other digital media. Recognizing these signatures and verifying their integrity identifies intellectual property to prevent its misuse, detect its modification or generate royalties.

The study of steganography encompasses the practice of hidden or obscured messages in printed and visible works, and includes outright cryptography and other ciphers which render the media unintelligible. Unlike cryptography, however, steganographic techniques in general do not obfuscate the underlying media item, and therefore do not draw attention the way encryption does. Therefore, while steganographic implementations may inject either readily visible or more obscured artifacts in the underlying media item, they generally do not prohibit intelligible reception by the user, but rather continue to merely denote the source or origin of the media item.

Identifying foreign executable software, i.e., software not intended for execution on a specific platform such as self-modifying malicious code, malware and pirated software, is more of a problem for software than for digital media. While encryption, code signatures, checksums and hash codes are common in the protection of executables, they are not in themselves executable. While these techniques secure transport, storage and validate origin and ownership as an important element of the chain of trust, they are removed prior to execution and can't protect the executable during actual execution.

SUMMARY

A method for encoding information, such as a covert message or executable software program, involves determining a call graph of an executable entity, such that the call graph is indicative of a plurality of invariant sequences resulting from different execution paths through the executable entity, and identifying an invariant sequence from the plurality of invariant sequences, in which the invariant sequence results from an execution path through the program. Such invariants are values or symbols in the program that are not affected by compilation, binding or execution such as opcodes (instructions) and static operands. An encoder computes an ordered sequence of information segments, such that the ordered sequence results from arbitrarily sized information segments defining the obscured information (covert message or executable software program). The encoder associates the invariant sequence with the ordered sequence of information segments, such that each information segment in the sequence corresponding to a particular invariant.

In configurations herein, a method for digital immunity is disclosed, which includes identifying a call graph of an executable entity, and mapping nodes of the call graph to a cipher table of obscured information, such that each node based on invariants in the executable entity, and the cipher table maintains associations between the invariants and the obscured information. Construction of an obscured information item, such as a executable set of instructions, involves extracting, from the cipher table, ordered portions of the obscured information, in which the ordered portions have a sequence based on the ordering of the invariants, and ensuring that the obscured information matches a predetermined ordering corresponding to acceptable operation, such as by execution of the instructions represented by the obscured information, herein referred to as a steganographic target program (to distinguish from the executable entity being evaluated).

In the particular example configuration disclosed, therefore, the obscured information is an instruction sequence, such that the instruction sequence is one of a plurality of instruction sequences having a predetermined order defining executable code for performing an indication of acceptable operation of the executable entity. The obscured information defines a steganographic target program, such that ensuring further comprises launching the steganographic target for generating a result indicative of acceptable performance. For example, the steganographic target program may send a message or set a flag that the executable entity may continue execution, as failure of the steganographic target program to launch would mean that the assembly failed, indicating a mismatch in the expected invariants and possible unauthorized modification to the executable entity. Further, any suitable information item may be defined by the obscured information, in addition to the executable code example shown herein.

The encoder generates a credential based on the associations, such that the credential has a set of information segments for each invariant in the invariant sequence, in which the information segments are authenticable by comparing each of the information segments to the corresponding invariant based on the generated credential. The sequence of authenticated information segments thus matches the corresponding sequence of invariants resulting from the execution path.

Authenticating a purported data item may then be performed by comparing each successive information segment in the data item to a successive invariant in an executed program, and identifying, based on the credential, the invariant corresponding to the information segment. An authenticator positively authenticates the data item if each successive invariant matches the corresponding invariant in the credential.

The purported data item may also be a covert message, any suitable data item, such as another program, image, or document. Information encoded (covered) in such a manner therefore defines a data channel such that the quantity of information in the information item defines the channel capacity based on the number of bits that can be transmitted in a particular time without error.

Identifying the obscured data item includes receiving a credential and an executable program, such that the credential and the executable program correspond to the obscured data item, in which the executable program has an invariant sequence defined by an execution path through the executable program, and the credential associates information segments to invariants. The recipient executes the executable program to identify a sequence of invariants, and the sequence of invariants is based on an execution path corresponding to a call graph as discussed above.

The call graph defines functions invocations, in which each function includes at least one invariant adapted for association with an information segment. The executed order of the invariants define an invariant sequence of the function. The call graph therefore defines a plurality of paths through the executable entity such as the executable program, in which each path defines a sequence based on branching at decision points in the program for invoking functions based on the branch taken at the decision point. Typically the execution path is responsive to function invocations based on an input stimuli such as user or stream input.

A recognizer maps, for each invariant in the sequence of invariants, the invariant to the associated information segment defined by the credential, and assembles, based on the mapped sequence of invariants, the obscured data item from the mapped information segments corresponding to the sequence of invariants. Failure to execute the invariants in the proper order, that is according to the execution path defined from the call graph from which the obscured data item was covered, will result in the assembly of a disordered and unintelligible data item.

DETAILED DESCRIPTION

One approach to detecting misuse of a computing device or software is to concurrently execute a monitoring program to detect the misuse while the monitored program executes. An example in common use is a license manager which may launched as a separate program to determine if the appropriate license keys are in place before allowing further use of the monitored program. Similarly, such monitoring programs may be used to detect inappropriate or unusual data inputs or geographic location information. Another approach to preventing misuse of a computer and its software is to provide a monitoring program with specific information such as facial or other images, voice or other aural cues and fingerprint or retinal patterns to verify or authenticate the user.

These monitoring programs may perform other functions on the executing platform or device in addition to or instead of actual monitoring of an executing program. Examples include managing access to file systems or communication channels, modifying device parameters such as processor speed or the ability to transmit, receive or process network communications.

A significant factor in the success of these monitoring programs is that they be obscured in some fashion to make detection and circumvention as difficult as possible. Current methods of obscuring such programs such as obfuscation, execution in restricted memory or embedding in hardware suffer several drawbacks. Implemented in software, they are detectable and readily circumvented. These techniques may require specialized hardware which is generally ill-suited to general purpose computing from a cost effectiveness or power consumption perspective.

The disclosed approach further obscures an executable monitoring program and/or identification information by further encoding segments of the information to be obscured in one or more specific covering functions using the call graph of a covering program. A call graph is a directed graph representation of all possible execution paths through a program. A call chain is a single execution path through the call graph. Call chain execution may be driven or influenced by external stimuli such as input data or device characteristics or operating environment. Call graphs may be considered context-insensitive if there exists only a single node representing each function in a call chain. However, a single node may be a component of multiple call chains.

Each symbol encoded in an executable covering function may be composed of arbitrary length segments of binary bits. For example, an image, voice print, digitized text or a binary file may be partitioned into n segments where $0<n\leq j$ with j as the number of bits in the information to be obscured. Generally, $n<<j$.

Figure 1:
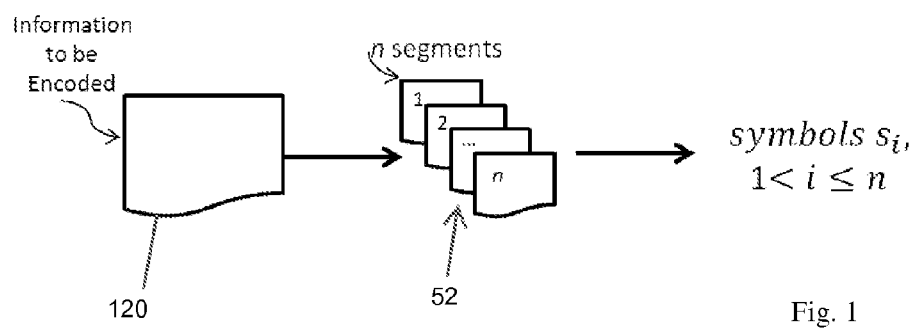
FIG. 1. shows partitioning of information to be obscured into symbols to be encoded using a regular grammar.

FIG. 1 shows partitioning of information to be obscured into symbols to be encoded using regular grammar. Referring to FIG. 1, an item of information 120 to be encoded or obscured may be a word, message, phrase, image or any information expressible in digital form. Configurations herein depict a particular approach for obscuring an executable computer program. The information 120 id decomposed into an ordered set 52 of segments or portions, and encoded by associating each to symbols. The information may be decoded, or reassembled by observing the order of the symbols and concatenating or assembling the segments back in the order prescribed by the symbols.

Each of these individual segments may be considered a single symbol. Thus a regular grammar, defined by a cipher table, can be constructed to encode each of these segments as individual symbols into a covering function using the steganographic method of the parent patent application cited above.

A finite state machine/automaton may be constructed to use a regular grammar (cipher table) associated with the sequence of executable invariants in the covering function to perform that decoding and accept (recognize) that the sequence of invariants and symbols are both in proper order. Otherwise the finite state automaton transitions to a reject state and other actions may be initiated. Comparing the decoded information to a key provided, possibly independently, from the encoding operation to the decoding operation thus completes the steganographic method of verifying executable code integrity. Segments of the obscured information may be partitioned in such a manner that a single function and its cipher table may contain all of the obscured information.

Because the disclosed approach doesn't make changes to the covering program, it also preserves the Kullback-Liebler Divergence at zero. This is a necessary and sufficient condition for this steganographic method to be considered "perfectly" secure.

In the current approach, segments of the information to be obscured may be encoded to specific functions on a single or multiple call chains so that retrieving and decoding these encoded segments in the proper order is required to restore the information obscured by the encoding.

Figure 2:
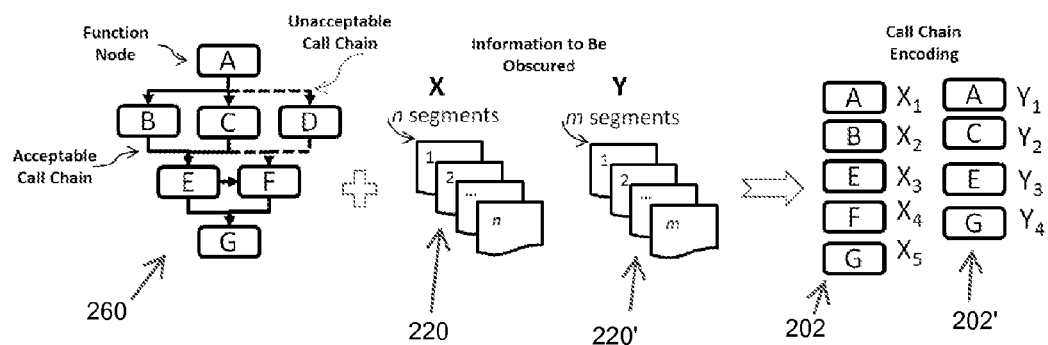
FIG. 2. shows encoding of individual segments of different information to be obscured to separate functions on separate call chains.

FIG. 2. Shows encoding of individual segments of different information to be obscured to separate functions on separate call chains. Referring to FIG. 2, a call graph 260 of an executable entity depicts available function invocations in the form of nodes defining functions and edges showing available invocations (calls). Information to be obscured, such as an executable program, is subdivided into segments; two such programs X and Y are illustrated to show how the same program, depicted as call graph 260, may yield different encoding based on run-time performance. Program X has 5 segments X1 ... X5, and is encoded to an ordering 220 defined by the call chain sequence A, B, E, F G 202. Similarly, the same call graph 260 yields a different call chain sequence 202' for corresponding to segments Y1 ... Y4 220' of program Y.

It can be seen, therefore, that the approach herein includes a method to partition and encode segments of the information to be obscured among the many separate functions in the call graph of an executable program in a way that retrieval of the obscured information in proper order is dependent upon the execution sequence of one or more call chains.

FIG. 2 therefore illustrates how different segments of information can be obscured by encoding them in different call chains within the same program. Assuming all nodes (functions) in the call graph 260 are reachable as indicated by a dotted or solid arc connecting them. We define acceptable call chains as those that may be chosen for use in encoding and unacceptable that may not be used for encoding for illustration purposes only; this characterization is not meant to limit the claimed approach.

In the example of FIG. 2, two different monitoring programs denoted X and Y, respectively have been partitioned into arbitrary sized segments 220, 220'. Each segment has been encoded as a set of symbols into a cipher table using the approach disclosed in the previous work. Thus each program has been encoded into a different call chain in the same covering program. However, since some nodes (functions) are on multiple call chains they encode the same information. For example, acceptable call chain [A, B, E, F, G] encodes monitoring program X and call chain [A, C, E, G] encodes program Y. X and Y are of different lengths and may perform entirely different functions yet they encode the same information in the functions they have in common, namely A, E, and G.

Note that an uninformed observer cannot by static analysis determine which call chain will be actually executed since this is determined at run time and dependent upon input stimuli to the program. Thus an uninformed observer would both need to have access to the secure encoding, which may be different for the same function in different versions of the same program, and would need to evaluate all possible call chains over all possible input stimuli in order to determine whether such an encoding even existed. In any but the most trivial cases this is computationally infeasible.

However, the process of retrieving the obscured information without knowledge of how it was encoded in the call graph is dependent on traversing all possible paths through the call graph. This is equivalent to the traversal of a static call graph and is thus by extension undecidable.

Credentials containing the mapping of elements of the obscured information may be transmitted to the executing platform or device in arbitrary order unrelated to the execution sequence of the program. Therefore examination of the body of credentials doesn't provide any information about the obscured information without knowledge of the path selected through the call graph during credential creation. This path information may be transmitted in a secure manner to the retrieval process on the computing device.

In a corresponding application cited above, the invariant symbols (invariants) define an alphabet from which to compose a steganographic message. The presently claimed approach expands the alphabet to information items, such that each message symbol maps to a particular invariant, and only a particular ordering of the information items will map correctly to the invariant sequences in the executed code. The information items may therefore form subsets, or information segments, of a larger date item, for which proper reassembly (or decoding) of the data item is dependent upon proper execution of the invariant sequence.

Configurations herein extend the approach of FIGS. 3 and 4 (below) by associating the invariants with alphabet (symbols) comprised of arbitrary sized information items, and the invariant sequence is defined by a call graph depicting stack based function calls of an executing entity (program). Thus, different sequences of execution that invoke different functions on the call graph define different sequences of invariants. The possible arrangement of invariants is therefore based on the number of independent paths through the program, which rapidly increase with the number of functions, in general. Further, the notion of a symbol is extended to an arbitrary information item, or segment, as discussed above. Accordingly, a symbol of the "alphabet:" defines a segment, or portion, of a larger data item such as a digital image, text, executable entity, etc. Further, the corresponding invariant sequence changes with the execution paths through the program, which is determined by the call graph based on the number of independent paths, and rapidly approaches a number of paths computationally infeasible to exhaustively examine as the nodes in the call graph increase.

Figure 3:
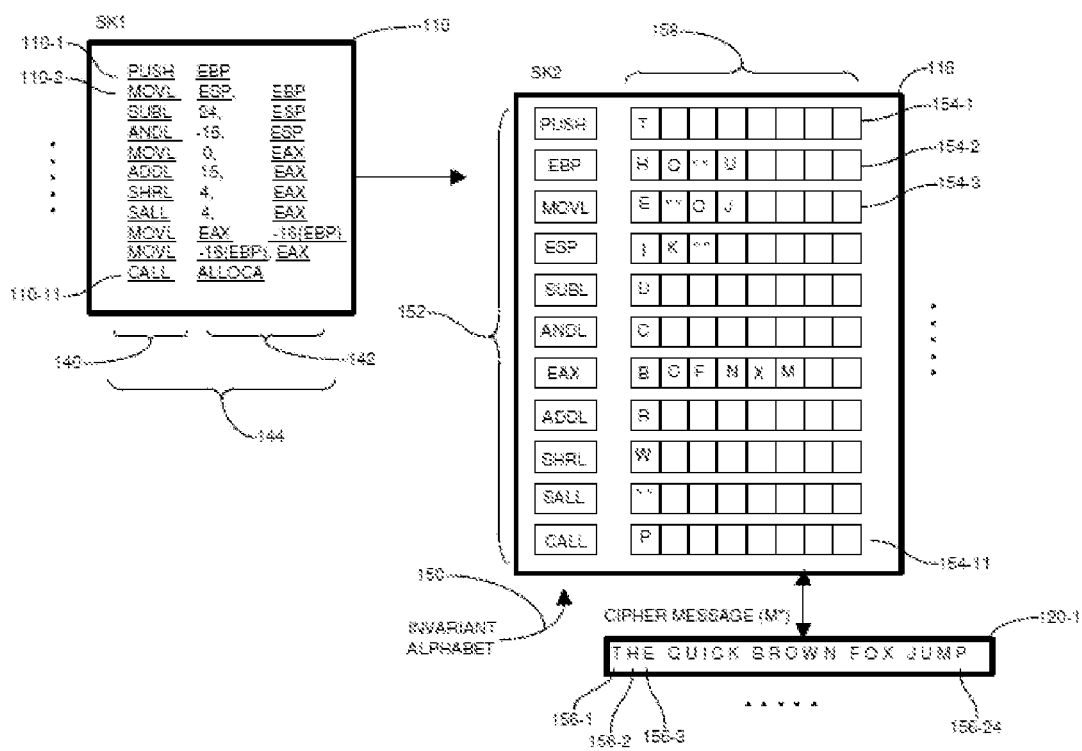
FIG. 3 presents a mnemonic form example of executable code.

FIG. 3 is a diagram showing steganographic watermark generation. A watermark is an obscured or visible marking which is very difficult to remove without disturbing the underlying data. Such a technique is employed herein to detect changes to the underlying program, as modifications to the underlying program also disturb the watermark. Referring to FIG. 3, a code segment 110 includes a sequence of opcodes 140 and operands 142. The exact format and value varies depending on architecture, but in general each 140 opcodes expects a number of 142 operands. Both 140 opcodes and operands 142 may be invariants 144 (underlined operands and opcodes), meaning that their value does not change in response to compiling and linking. In contrast, some operands are relocatable, meaning that they employ a value relative to a memory page or stack location, and thus change value from one instantiation to another.

Each invariant 144 of the executable code 110 may be represented by an invariant symbol 150 in the cipher table. The set of invariant symbols 152 defines an alphabet from which to compose a steganographic message. For each invariant symbol 150, a cipher table entry 154-1 ... 154-11 (154 generally) includes a set 158 of each message symbol 156 associated with that invariant symbol 150. Generating the cipher table 116, more generally referred to as a symbol table to denote mapping between alphabets (set of invariants 152 and message symbols 156), includes mapping each message symbol (i.e. character) 156-1 ... 156-24 (156 generally) from the message 120-1 to a corresponding entry 154 for the invariant occurring in that position. For example, beginning with the first symbol 156-1 of the message 120-1, message symbol 156-1 ("A") is associated to the first invariant PUSH from line 110-1. The message symbol "T" 156-1 is added to the entry 154-1 for the message symbol 150 for PUSH. The second message symbol 156-2 associates with the $2^{nd}$ invariant EBP, also from line 110-1, thus storing the message symbol "H" (156-2) in entry 154-2. Third message symbol "E" (156-3) associates with MOVL, from code segment line 110-2, to add "E" to entry 154-3. Continuing parsing on line 110-2, ESP maps to entry 154-3 for storing message symbol 156-4 (" "). Message symbol 156-5 associates "Q" with EBP, also in line 110-2. As there is already an entry 154-2 for EBP, message symbol 156-5 adds "Q" to entry 154-2. It should be noted that the set 158 of entries associated with an invariant symbol 150 is one of inclusion only, and not an ordering of the appearance of the message symbols within it. The encoder 114 associates the remaining message symbols 156 to the invariants 144 in corresponding positions, and the association mapped in the entry 154 for the corresponding invariant symbol 150.

Upon completion, the steganographic message 120-1 is encoded in the code segment 110, while leaving the code segment 110 unchanged, by mapping the invariant symbols 150 to message symbols 156, therefore defining a translation between the alphabet of symbols (invariants 152 and conventional ASCII) from which each is composed. It should be further noted that mere knowledge of only one credential (symbol table 116 or message 120-1) is insufficient to derive the message from the code segment 110; both must be employed in a validation attempt. The strength of the protection lies in the fragility of the steganographic message. It is very difficult and highly unlikely that a modification could be made to the ordered invariants 110 (stegotext) and not disrupt the computed steganographic message 120 mapped to the invariants.

The executable code 110 of FIG. 3 presents a mnemonic form example of executable code (X86/AT&T syntax) bound through the cipher table 116 to represent a hidden message (m*) as a many-to-many or non-injective (many-to-many) mapping of invariants to hidden message symbols. During the watermarking process, the disclosed method uses these invariants as an alphabet to steganographically represent information. Thus the watermarking process transforms the executable code from a cleartext into a stegotext containing hidden information without modifying the executable code itself or its execution topology.

Recognizing a watermark and decoding its hidden message uses the invariants in identified in each machine instruction an index into the cipher table 116. Subsequently, it must be determined that a symbol represented by that invariant is the correct one for that point in the hidden message (m*).

The disclosed steganographic cryptosystem may be applied to any computing architecture wherein executable code instructions contain invariants that enable the creation of an alphabet independent of the actual computing architecture. In this section we describe an example the, without limitation, demonstrates the utility of our steganographic cryptosystem in preventing the execution of foreign code.

All or portions of an executable code segment may be watermarked. Each portion might contain only certain functions or routines. These can be selected either by a user such as a security engineer or in an automated fashion by an analysis program such as a debugger or reverse engineering algorithm. Each watermarked portion would have a potentially unique credential. For example each of these credentials might use a different set of invariants and a different hidden message. The use of multiple credentials per executable code segment increases the complexity of the watermark and further enhances the security of the watermarking process since each credential would be statistically unrelated to another. This use of composite watermarks forms the basis of a "one time pad" cryptographic approach, discussed further below with respect to FIG. 4.

The recognition of these composite credentials is straightforward. During execution a recognition program is invoked when certain conditions are met such as particular actions are requested by an executing software application. An example of these trigger events is kernel level system services requests by the watermarked application. When these triggers are invoked the recognition program determines which, if any, credential should be used to decode the watermark. This can be accomplished using virtual address or other information usually used to manage the virtual address space of the executing program.

The credential associated with the particular portion of the executable code segment is retrieved from a potentially secure storage space using any suitable method. The credential is then used to verify the integrity of the watermark. If the watermark is valid, invalid or doesn't exist different actions may be taken based on "response rules" maintained in a policy management system.

The execution of a program often requires the traversal of a call graph wherein different portions of the executable code are executed in response to control transfers created by one portion of the program "calling" another portion or perhaps a different program altogether. These control transfers often suspend execution of the "calling" code segment and return control to it after the "called" code segment has completed its execution path. In particular configurations, the recognition of watermarks in any portion of executable code in response to a triggering event may initiate the recognition of watermarks on all or a subset of the suspended "calling" routines. In this way all "active" portions of a watermarked executable may be recognized whenever recognition is triggered on any portion of watermarked executable code. This enables detection and prevention of so-called run time buffer overflow attacks wherein the "call chain", the addresses or stack frames of suspended executable code segments, are contaminated by foreign code. For example, it is common practice in operating system kernels to use a stack-based data structure to contain "stack frames", data structures containing return addresses and other information used to maintain proper execution sequencing among execution and suspended executable code segments. When a recognition program is triggered it can dereference stack frames on both the kernel and/or the application stack to determine what executable code segments should be have their associated credentials retrieved and watermarks versified. This technique will prevent the execution of the common buffer overflow vulnerability.

Figure 4:
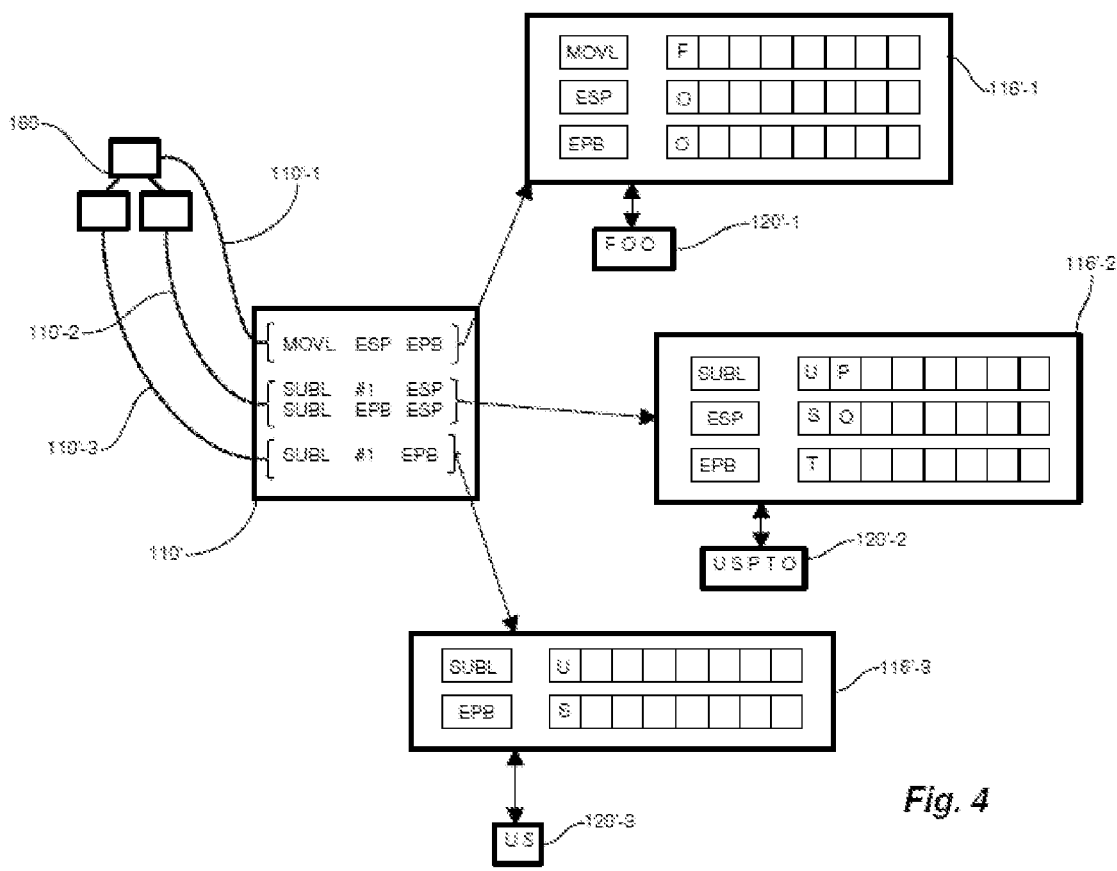
FIG. 4 shows the mapping between the symbol alphabets of FIG. 3 using a composite watermark for showing non-deterministic (many to many) mapping between symbols in different alphabets.

FIG. 4 shows the mapping between the symbol alphabets of FIG. 3 using a composite watermark for showing non-deterministic (many to many) mapping between symbols in different alphabets. A call graph may be represented as a directed graph or tree illustrating conditional branching in the code segment. Each edge of the graph illustrates a portion corresponding to the invariants defining the sequence for that branch. A composite watermark associates a message and corresponding cipher table with each portion, or combination of portions, to be employed when the code execution takes the path corresponding to those portions.

Figure 5:
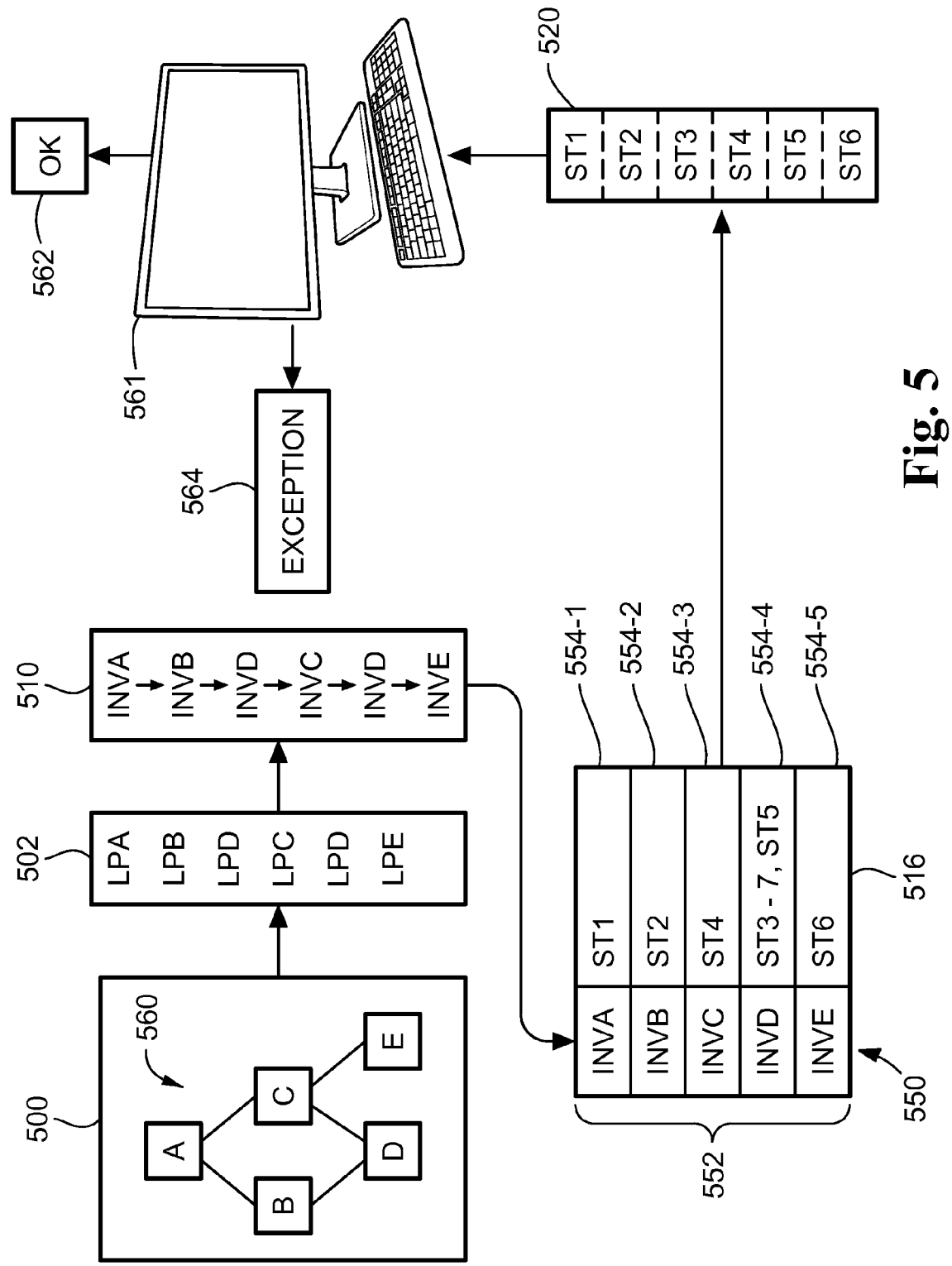
FIG. 5 shows steganographic embedding of executable code.

Referring to FIGS. 3 and 4, code execution may be represented as a call graph 160 indicative of conditional and unconditional transfers of control between code segments 110'-1 . . . 110'-3 (110' generally). Each code segment 110' may correspond to a credential pair represented as a message 120 and cipher table 116, collectively referred to as a composite watermark. Referring to FIG. 5, the call graph 160 denotes code segments 110'-1 . . . 110'-3. Each code segment 110' has a corresponding message 120'-1 . . . 120'-3 (120' generally) and cipher table 116'-1 . . . 116'-3 (116' generally).

The set of credentials 116', 120' define a composite watermark, in which the composite watermark is defined by a plurality of watermark messages 120' corresponding to a respective plurality of invariant sequences 110', such that parsing includes selectively identifying a particular sequence of invariants based on conditional or invoked execution of portions of the code segment 110', and identifying a cipher table 116' corresponding to the parsed sequence 110'. For each segment 110' a watermarker or other monitoring program (568, FIG. 6, below) maps the invariants 150 to the identified cipher table 116' to yield the authentication message 120', and compares the authentication message 120' to the watermark corresponding to the respective invariant sequence, as disclosed above. The watermarker identifies a call graph 160 defined by selective invocation of conditional or unconditional code segments 110', such that the call graph 160 is indicative of a transfer of control to a different stack based call frame. Such transfers may be conditional or absolute, and may be imposed from either the source code or compiler operation. The monitoring program invokes identification of the sequence of invariants 150 based on the transfer of control from the call graph 160, such that the code segment 110' is relative to the stack based call frame from the control transfer. As above, the decoder compares the mapped invariants 150 including instructions referenced from the stack based call frame, and employs a watermark corresponding to the conditional code segment 110' such that modifications to stack based call frame instructions are included in the watermark comparison.

A further aspect shown is many to many mapping of invariants 150 to message symbols 156. Segment 110'-1 maps occurrences of message symbol "O" to invariants "ESP" and "EPB", thus "O" may refer to either ESP or EPB in the invariant sequence. Conversely, code segment 110'-2 maps "U" and "P" to SUBL, and maps "S" and "O" to ESP, thus invariant SUBL may correspond to either U or P, and invariant ESP may correspond to either S or O. There is not a consistent substitution of a symbol in one alphabet to stand for the same symbol in a parallel alphabet.

FIG. 5 shows steganographic embedding of executable code. Referring to FIGS. 3-5, the approach for steganographic embedding of executable code combines the two previous concepts, specifically execution paths of invariants and assembling obscured information (previously a "message" or "watermark") defined by an executable entity (program) 500. An example digital immunity environment discussed with respect to FIGS. 5 and 6 includes a launched program LP having digital immunity protection as disclosed herein, sequences of invariants INV, similar to the individual invariant values 110 of FIGS. 3 and 4, and a steganographic target ST program, which results from proper mappings of the invariant to the cipher table 116, and represents the hidden information as in the stegotext 120 of FIGS. 3 and 4. FIG. 5 shows a call graph 500 depicting function invocation and structure of a launched program LP 500, having functions A . . . E. Each function executes a code sequence LPA . . . LPE, which includes a sequence of one or more invariants denoted as INVA . . . INVE. As above, the invariants LP are generally compiled values in the code that are not modified by subsequent binding or runtime operations, and therefore remain invariant throughout execution, such as opcodes and constant operands. However, in contrast to FIG. 3, and as shown in FIG. 4, an invariant sequence includes a plurality of invariants, based on the instructions in the entire function, rather than the single invariant entry in the cipher table 116 of FIG. 3.

In the example configuration shown, the information segments defining the message are portions of a steganographic target program 520, which is analogous to the authentication message 120-1 with program portions ST1 . . . ST6 defining the symbols 156 that concatenate to form the complete unit of obscured information. As the program 500 executes, decision paths taken by program execution define a call chain 502, which is a sequence of the invariants as executed at runtime. Static analysis of the program cannot provide such information because it is undefined until program execution, and varies based on decision branches computed and taken at runtime. The order of execution of the call chain 502 determines a sequence of invariants 510, in which each sequence of invariants INVA . . . INVE (INVn, generally) includes one or more invariants LPA . . . LPE (LPn, generally) contained in the respective function A . . . E. Each invariant maps to a portion of a steganographic target program 520, represented by portions ST1 . . . ST6 (STn, generally). Correct execution of the program 500 yields the obscured information defined as the steganographic target 520, which is executed on the host 561 (typically the same computer running the program 500) which executes to indicate a favorable result 562. In an example configuration, incorrect or non-assembly of the steganographic target 520 results in incorrect or non-execution for indicating a non-favorable result 564, calling for an exception to be raised. Alternatively, any suitable response or invocation may be performed once the call chain produces a correct ordering of the invariants recognized as the obscured information.

In the configurations above, the credential includes the cipher table 516, such that cipher table has an entry 554-1 . . . 554-5 (554 generally) for each association between the invariants 552 and an obscured information portion STn, such that each of the invariants INVn corresponds to an invariant sequence. The invariants INVn are based on identifying the nodes in the call graph 560, such that the nodes correspond to stack based control transfers in the executable entity 500, each invariant sequence based on a call frame on the stack.

In execution, each invariant INVn maps to an entry 554-1 . . . 554-5 in the cipher table 516. For each function LPn executed, the sequence of invariants INVn from the function are mapped into the cipher table 516. The matching entry 554 matching the invariants in the alphabet 552 yields the next portion of the steganographic target program 520. Hence the first function A returns ST1. A calls B, so the next call chain entry maps INVB to ST2, and concatenates ST2 to the steganographic target program 520. B calls D, so the next mapped entry is 554-4, based on INVD, returning ST3 to add to the program 520. However, D is also subsequently called by C, triggering a second occurrence of INVD based on the call chain 502. Following the addition of ST4 from the invocation of C, a second invocation of D matches entry 554-4. In the example shown, the entries 554 represent sequences of portions for concatenating to generate the steganographic target program 520, and returns the next portion ST5.

Thus, the second occurrence of INVD in the call chain 510 maps to the second portion ST5 in the entry 554-4. Proper ordering of the invariants INVn ensures that the portions of the steganographic target 520 are assembled for proper execution. In the example of FIG. 3, each entry 154 in the cipher table 116 represents an unordered set of items, which are letters in the obscured information 120 message. Since authentication checks only for membership in the corresponding entry 154, the actual ordering is not deterministic of a positive authentication. In FIG. 5, where an executable program 520 is assembled, ordering of the portions STn is significant to ensure proper concatenation of the portions.

Alternatively, the steganographic target program 520 could be constructed such that each entry 554 has only one portion STn for contributing to the steganographic target program 520, or the target program 520 constructed such that duplication of the same portion (ST3, in this case) may be appended in multiple locations in the steganographic target program 520. Due to the complexities in executable code, it may be problematic to identify portions STn that may be concatenated in multiple locations with accurate results, however a sufficiently simple portion may suffice. In all but trivial cases, the "alphabet" 550 of invariant symbols are unlikely to be repeated, due to the possible permutations of invariant values in the functions LPA . . . LPE.

The example of FIG. 5 shows a particular configuration depicting assembly of a target program in response to a particular call chain 560. In general, any suitable action or invocation may be initiated upon correct assembly of the obscured information based on a particular call chain. A recognizer or other analyzing entity The assembly of the obscured information, depicted as a steganographic target program 520 in the example of FIG. 5, therefore represents a second level of information over the message 120-1 of FIG. 3. The second level of hidden message information relating to the traversal through a particular call chain has to do with the composition of the symbols recognized. Since these "symbols" can be or arbitrary size (each containing the text from pages, paragraphs or sentences from a book for example), a secondary action may be tied to assembly of the obscured information. Traversal of a particular call chain allows the recognizer to not only verify that the functions (nodes in the call chain) are intact but it can also extract the second level of hidden information (the text from the book). This then allows the embedding of an executable program (as well as other information) that can be launched by the recognizer (or some other action can be taken).

The second level of information becomes available when the call chain matches a sequence previously associated with the obscured information. The call chain is obtained by traversing the stack of an executing program. Stack traversal may be initiated by any suitable mechanism, such as a system call. Since the call chain at a particular time is based on the decisions taken by the executing program, a particular set of inputs that cause a certain call chain may be supplied. Once the call chain is in a particular order, as defined by the invariants mapping to a recognizable item of obscured information, the obscured information becomes available for execution, viewing or other actions or operations. Since the triggering call chain is not defined until runtime with a particular input set, static analysis of the executable entity cannot yield the triggering call chain.

Figure 6:
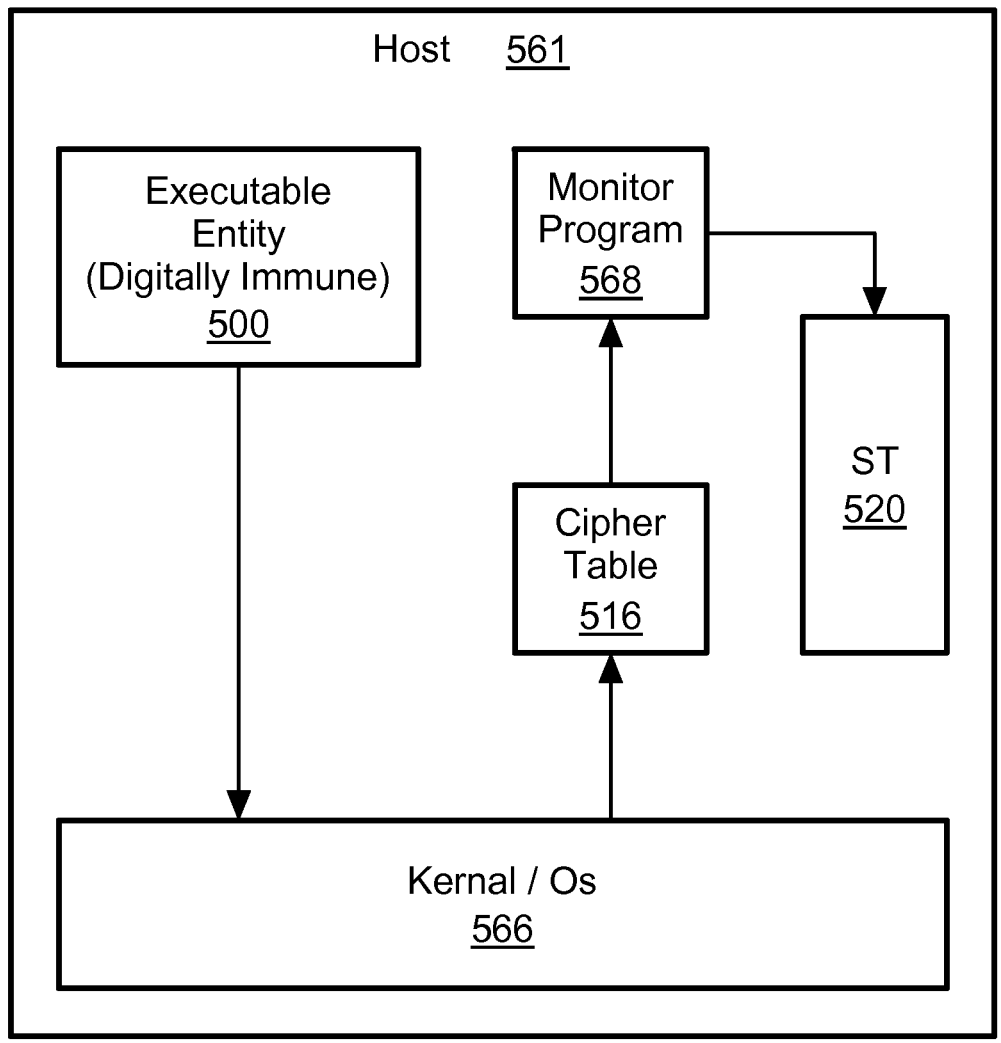
FIG. 6 shows a context view of the approach of FIG. 5 in a digital immunity context.

The call chain may include the linkage of multiple programs such as a main application and several libraries, where the libraries are linked as objects. The call chain through the linked program may contain a call chain representing the second level of hidden information. Thus, each program to be linked to create a single executable may contain a portion of the call chain. Therefore, an attacker would need to traverse all the paths of all of the potentially linkable code in order to extract the second level information. Since the credentials for these may not be known until the program executes it is virtually impossible to extract the second level before execution and even then it would be sensitive input data FIG. 6 shows a context view of the approach of FIG. 5 in a digital immunity context. The digital immunity approach presented is superior to conventional virus and malware scans because the conventional approaches look for "undesirable" sequences in the target program, and if none are found, the program is permitted to run. The shortcoming with this approach is that malware will be undetected until a malware sequence is identified and matched to the program—in other words, the program is assumed to be malware free until malware is found. In the approach herein, the invariant sequence must remain unaltered in order to map and create the executable steganographic target 520 for execution, and any deviation from the expected execution of the steganographic target will indicate malware. In other words, the program is presumed untrusted until shown to have NO modifications, hence has no extraneous changes whether identified as malware or not. Conventional approaches permit malware changes which have not yet been shown to contain harmful sequences.

Referring to FIGS. 5 and 6, the launched program 500 is one which is sought to be protected from malware attacks precipitated by changing the executable code. An execution environment is defined by a host computer 561, but may encompass any suitable network of interconnected or clustered CPUs. A kernel 566 or other operating system interface or mechanism monitors execution and stack-based invocations in the program 500 for performing the operations of FIG. 5 above. The kernel 566 invokes a monitoring program 568, which receives the call graph 502 from the executing program 500. The symbol table 516 has been previously generated based on the known expected invariants from the program 500, and the expected (correct) path defined by the call graph 502. The symbol table 516 also contains the portions STn of the steganographic target program for concatenation or other assemblage into the executable entity representing the positive (trusted) execution. Upon receiving information of the executed invariants INVn and the call graph LPn, the monitoring program 568 matches the invariants INVn of each invoked function LPn to map the corresponding portion STn of the program 520. Upon completion, the host 561 executes the assembled steganographic target program 520 to compute a normal 562 or exception 564 result.

Alternatively, the steganographic target 520 represents a hidden program or function designated for covert operation pending a triggering call chain established by a predetermined input sequence. The cipher table 516 is a credential that references the portions STn of the steganographic target 520 based on the execution call chain 502. Upon invocation, the monitor program 568 traverses the current stack of the host 561 to determine the call chain. For each function in the call chain 502, the monitor program 568 receives the corresponding portion STn from the cipher table. Some functions may not have a cipher table entry 554 associated, and hence return null. Upon proper assembly of the steganographic tarter 520 by the monitor program (recognizer), based on the call chain 502 matching a predetermined sequence, the monitor program launches the steganographic target 520.

In operation in the environment of FIG. 6, the host 561 first establishes the obscured information by receiving the steganographic target 520 operable for launch and execution indicative of acceptable operation. The steganographic target 520 is the program that is launched by successful generation and concatenation of the portions STn from the cipher table 516, based on proper mapping from the execution paths. The steganographic target is subdivided into portions STn, and the cipher table 516 generated by associating each portion STn with an invariant sequence INVn in the executable entity 500.

Upon invocation of the executable entity for execution, the host 561 evaluates the executable entity for trusted operation by launching the executable entity, and the monitoring program 568 intercepts each invocation of code corresponding to a node on the call graph 560. The monitoring program matches the invariants of the corresponding node to the cipher table 516 to identify corresponding portions STn and ordering of the steganographic target program 520. Generally, the call graph 560 is based on decision branches or stack invocations in the executable entity, however other approaches to structuring the sequence of individual atomic invariants could be performed.

Those skilled in the art should readily appreciate that the programs and methods defined herein are deliverable to a computer processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for digital immunity comprising:
identifying a call graph of an executable entity;
mapping nodes of the call graph to a cipher table of obscured information, each node based on invariants in the executable entity, the cipher table maintaining associations between the invariants and the obscured information, wherein the obscured information defines a steganographic target;
extracting, from the cipher table, ordered portions of the obscured information, the ordered portions having a sequence based on the ordering of the invariants; and
detecting that the obscured information matches a predetermined ordering corresponding to a desired operation, wherein the step of detecting further comprises the steganographic target generating a result corresponding to a desired action.

2. The method of claim 1 further comprising: identifying, from the call graph, a call chain indicative of an invocation order; and mapping the nodes based on the invoked order.

3. The method of claim 2 further comprising: traversing a call stack to determine an order of call frames during runtime, the call frames based on the invocation order determined by inputs to the executable entity.

4. The method of claim 1 wherein the obscured information is an instruction sequence, the instruction sequence being one of a plurality of instruction sequences having a predetermined order defining executable code.

5. The method of claim 4 wherein the obscured information defines a steganographic target program, and wherein the step of detecting further comprises launching the steganographic target program for generating the result corresponding to the desired action.

6. The method of claim 5 wherein the call graph is based on decision branches or stack invocations in the executable entity.

7. The method of claim 1 wherein the cipher table has an entry for each association between the invariants and an obscured information portion, each of the invariants corresponding to an invariant sequence, further comprising identifying the nodes in the call graph, the nodes corresponding to stack based control transfers in the executable entity, each invariant sequence based on a call frame on the stack.

8. The method of claim 1 further comprising establishing the obscured information by: receiving the steganographic target operable for launch and execution indicative of acceptable operation; subdividing the steganographic target into portions; and generating the cipher table by associating each portion with an invariant sequence in the executable entity.

9. The method of claim 1 further comprising evaluating the executable entity for trusted operation by: launching the executable entity; intercepting each invocation of code corresponding to a node on the call graph; and matching the invariants of the corresponding node to the cipher table.

10. The method of claim 1 wherein the desired operation does not include a function of the call graph.

* * * * *